United States Patent
Yang et al.

(10) Patent No.: US 10,277,922 B2
(45) Date of Patent: Apr. 30, 2019

(54) METHOD AND DEVICE FOR CONTROLLING RECEPTION OF BROADCAST SERVICE PROVIDED BY MEANS OF APPLICATION LAYER FORWARD ERROR CORRECTION

(71) Applicant: Samsung Electronics Co., Ltd., Suwon-si, Gyeonggi-do (KR)

(72) Inventors: Hyun-Koo Yang, Seoul (KR); Sung-Hee Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/320,661

(22) PCT Filed: Jun. 19, 2015

(86) PCT No.: PCT/KR2015/006235
§ 371 (c)(1),
(2) Date: Dec. 20, 2016

(87) PCT Pub. No.: WO2015/194903
PCT Pub. Date: Dec. 23, 2015

(65) Prior Publication Data
US 2017/0150187 A1    May 25, 2017

(30) Foreign Application Priority Data
Jun. 20, 2014  (KR) .................. 10-2014-0076091

(51) Int. Cl.
*H04N 21/234*  (2011.01)
*H04H 40/18*  (2008.01)
(Continued)

(52) U.S. Cl.
CPC .......... *H04N 21/234* (2013.01); *H04H 40/18* (2013.01); *H04L 1/0023* (2013.01);
(Continued)

(58) Field of Classification Search
CPC .. H04N 21/234; H04N 21/242; H04N 21/647; H04N 21/235; H04N 21/4302;
(Continued)

(56) References Cited

U.S. PATENT DOCUMENTS

| | | | |
|---|---|---|---|
| 6,366,959 B1* | 4/2002 | Sidhu | H04L 65/604 709/214 |
| 2006/0279437 A1* | 12/2006 | Luby | H04L 1/0042 341/50 |

(Continued)

FOREIGN PATENT DOCUMENTS

| | | |
|---|---|---|
| CN | 102984091 A | 3/2013 |
| WO | 2008-006014 A2 | 1/2008 |

(Continued)

OTHER PUBLICATIONS

Park et al. "Study of ISO/IEC CD 23008-1 MPEG Media Transport", ISO/IEC, Oct. 2012.*

(Continued)

*Primary Examiner* — Pankaj Kumar
*Assistant Examiner* — Alexander Boyd
(74) *Attorney, Agent, or Firm* — Jefferson IP Law, LLP (57) ABSTRACT

A method for receiving media data by a receiving apparatus in a multimedia system, the method comprising: receiving, from a transmission apparatus, a signaling message; and decoding media data corresponding to each of at least two assets based on control information included in the signaling message; wherein the control information includes time information to control an output time of decoded media data for each of the at least two asset.

6 Claims, 6 Drawing Sheets

(51) Int. Cl.
*H04L 1/00* (2006.01)
*H04N 21/242* (2011.01)
*H04N 21/647* (2011.01)

(52) U.S. Cl.
CPC ......... *H04L 1/0047* (2013.01); *H04N 21/242* (2013.01); *H04N 21/647* (2013.01)

(58) Field of Classification Search
CPC ............. H04N 21/4307; H04N 21/435; H04N 21/8547; H04L 1/0047
See application file for complete search history.

(56) References Cited

U.S. PATENT DOCUMENTS

| | | | |
|---|---|---|---|
| 2008/0022190 A1 | 1/2008 | Ver Steeg | |
| 2013/0034146 A1* | 2/2013 | Jeong | H04N 7/147 375/240.01 |
| 2013/0100968 A1 | 4/2013 | Vafin et al. | |
| 2014/0098811 A1* | 4/2014 | Bouazizi | H04L 65/4084 370/389 |
| 2014/0105310 A1 | 4/2014 | Hwang et al. | |
| 2014/0314158 A1 | 10/2014 | Hwang et al. | |
| 2014/0369222 A1 | 12/2014 | Kim et al. | |
| 2015/0067452 A1* | 3/2015 | Iwami | H04N 21/2401 714/776 |
| 2015/0373380 A1* | 12/2015 | Tsukagoshi | H04N 21/2362 725/109 |
| 2016/0173919 A1* | 6/2016 | Iguchi | H04N 21/4622 725/116 |
| 2016/0261897 A1* | 9/2016 | Kim | H04N 21/2401 |

FOREIGN PATENT DOCUMENTS

| | | |
|---|---|---|
| WO | 2013-077662 A1 | 5/2013 |
| WO | 2013-112027 A1 | 8/2013 |
| WO | 2014-058237 A1 | 4/2014 |

OTHER PUBLICATIONS

Ali C. Begen, "Error Control for IPTV over xDSL Networks,"In: Proceedings of the 5th IEEE Consumer Communications and Networking Conference (CCNC 2008), pp. 632-637 Jan. 10, 2008.
Shanghai et al., Study of ISO/IEC CD 23008-1 MPEG Media Transport, ISO/IEC JTC1/SC291WG11 MPEG/N13089, XP055306392, Oct. 1, 2012.
European search report dated Feb. 5, 2018, issued in the European application No. 15810288.9.
High efficiency coding and media delivery in heterogeneous environments, Part 1: MPEG media transport (MMT), Jun. 1, 2014.
Examination report dated Feb. 19, 2019, issued in the Japanese Patent Application No. 2017-519435.

* cited by examiner

FIG.7

METHOD AND DEVICE FOR CONTROLLING RECEPTION OF BROADCAST SERVICE PROVIDED BY MEANS OF APPLICATION LAYER FORWARD ERROR CORRECTION

CROSS-REFERENCE TO RELATED APPLICATION(S)

This application is a U.S. National Stage application under 35 U.S.C. § 371 of an International application filed on Jun. 19, 2015 and assigned application number PCT/KR2015/006235, which claimed the benefit of a Korean patent application filed on Jun. 20, 2014 in the Korean Intellectual Property Office and assigned Serial number 10-2014-0076091, the entire disclosure of which is hereby incorporated by reference.

TECHNICAL FIELD

The present disclosure relates to a method and apparatus for controlling reception of a broadcast service provided using application layer forward error correction (AL-FEC).

BACKGROUND ART

As a broadcasting and communication convergence environment is provided together with ultra-high-speed wireless network and Internet, a converged content consumption environment has been established in which terminals having various capabilities coexist. In this context, due to increase of high-volume contents, data congestion on a network becomes worse. Thus, there is a need for schemes for supporting a signal receiver in repair of data lost on the network.

Application layer forward error correction (AL-FEC), which is one of the schemes, configures a source block with a preset number of data packets, which are referred to as source packets having various lengths, adds parity data or repair information such as a repair packet to the source block through FEC coding, and transmits the source block in the unit of an FEC packet block within a preset time. The FEC packet block means all of the source packets configuring the source block and the entire repair packet generated for protecting the source block.

When the data loss repair scheme is used, a signal transceiver undergoes a time delay in transmission of a packet block due to application of the data loss repair scheme.

As a result, to repair a data loss by combining de-jittering for removing packet jitter occurring on the network with AL-FEC, a hypothetical receiver buffering model (HRBM), which is a buffering model of a virtual signal receiver, is needed.

Accordingly, there is a need for more detailed schemes for efficiently performing a data loss repair operation and a de-jittering operation.

SUMMARY

The present disclosure provides a method and apparatus for controlling reception of a broadcast service provided using AL-FEC.

The present disclosure also provides a method and apparatus for controlling an operation of a receiver as delivering control information for AL-FEC decoding and de-jitter buffering to the receiver.

According to an aspect of the present disclosure, there is provided a method for receiving media data by a receiving apparatus in a multimedia system, the method comprising: receiving, from a transmission apparatus, a signaling message; and decoding media data corresponding to each of at least two assets based on control information included in the signaling message; wherein the control information includes time information to control an output time of decoded media data for each of the at least two asset.

According to another aspect of the present disclosure, there is provided a method for a method for transmitting media data by a transmission apparatus in a multimedia system, the method comprising: generating control information for media data to be transmitted; transmitting a signaling message comprising the control information; and transmitting media data corresponding to each of at least two asset; wherein the control information includes time information to control an output time of decoded media data after decoding media data corresponding to each of the at least two asset by a reception apparatus.

According to another aspect of the present disclosure, there is provided a receiving apparatus for receiving media data in a multimedia system, the receiving apparatus comprising: a transceiver configured to receive, from a transmission apparatus, a signaling message; and a decoding unit configured to decode media data corresponding to each of at least two asset based on control information included in the signaling message; wherein the control information includes time information to control an output time of decoded media data for each of the at least two asset.

According to another aspect of the present disclosure, there is provided a transmission apparatus for transmitting media data in a multimedia system, the transmission apparatus comprising: a controller configured to generate control information for media data to be transmitted; a transceiver configured to transmit a signaling message comprising the control information, and transmit media data corresponding to each of the at least two; wherein the control information includes time information to control an output time of decoded media data after decoding media data corresponding to each of the at least two asset by a reception apparatus.

According to the present disclosure, control information for controlling AL-FEC decoding and de-jitter buffering of a receiver that receives a broadcasting service provided using AL-FEC is generated and delivered to the receiver, which then controls its operations based on the control information when performing AL-FEC decoding and de-jitter buffering, and a buffer structure of the receiver is proposed in which AL-FEC decoding and de-jitter buffering are applied based on one repair flow for at least two assets, and control information configured correspondingly is specified.

DETAILED DESCRIPTION

Hereinafter, the operating principles of exemplary embodiments of the present disclosure will be described with reference to the accompanying drawings. Like components are referred to as like reference numerals even through being illustrated in different drawings, and in the following description, a detailed description of related well-known functions or configurations will not be provided if it unnecessarily obscures the subject matter of the present disclosure. Further, the terminologies to be described below are defined in consideration of functions in the present disclosure and may vary depending on a user's or operator's intention or practice. Therefore, the definitions should be made based on the contents throughout the entire description of the present disclosure.

More specifically, for a communication system to which an embodiment of the present disclosure is applied, a Moving Picture Experts Group (MPEG) Media Transport (MMT)-based system, which is an MPEG media transport technique, will be described as an example. However, it should be noted that an embodiment of the present disclosure may also be applied using communication systems other than an MMT system.

In an embodiment of the present disclosure, HRBM may be applied such that a delay of packets generated due to AL-FEC has a fixed value.

Figure 1:
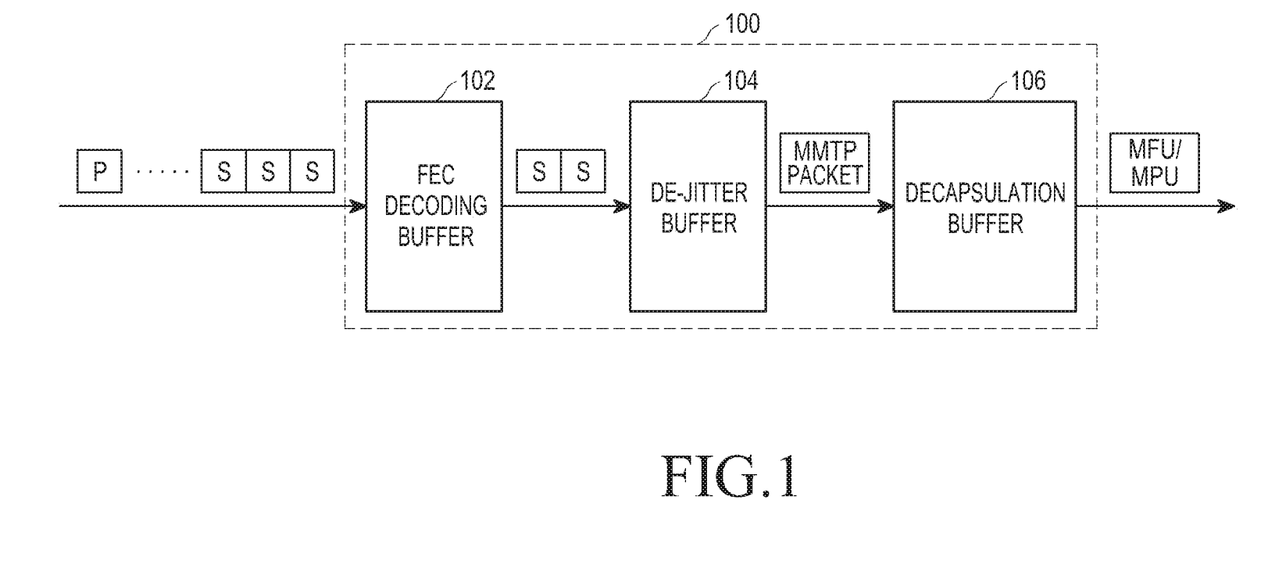
FIG. 1 is a structural diagram illustrating an example of HRBM applied according to an embodiment of the present disclosure.

FIG. 1 is a structural diagram illustrating an example of HRBM applied according to an embodiment of the present disclosure.

Referring to FIG. 1, a HRBM-applied receiver 100 may include an AL-FEC decoding buffer 102, a de-jitter buffer 104, and a de-capsulation buffer 106.

Once the receiver 100 receives AL-FEC coded packets P, . . . , S, S, S over a transport network, the AL-FEC decoding buffer 102 performs AL-FEC decoding with respect to the received packets and outputs the AL-FEC decoded packets to the de-jitter buffer 104. The de-jitter buffer 104 applies a fixed end-to-end delay value D, which is preset to include a delay and a jitter of the packets occurring due to characteristics of the transport network and a delay and a jitter of the packets occurring due to the AL-FEC decoding, to input packets. The HRBM structure may be configured for each asset of a service, that is, for each content component. The fixed end-to-end delay value D is previously determined by a transmitter in initial network setup based on a feedback of the receiver 100 or the like, and is delivered to the receiver 100 through a signaling message before packet transmission. Generally, the fixed end-to-end delay value D may be determined by adding a protection window time for AL-FEC to a maximum value of the delay and jitter occurring due to the characteristics of the transport network. Herein, the protection window time will be described in detail below.

As a result, the delay value D is applied to packets output by the de-jitter buffer 104 and the packets are output at the same time so as to be delivered to the MMTP decapsulation buffer 106.

Hereinbelow, an embodiment of the present disclosure proposes a method and apparatus for controlling AL-FEC decoding and de-jitter buffering of the receiver 100 for packets of a broadcasting service provided using AL-FEC for repairing lost data.

More specifically, a transmitter according to an embodiment of the present disclosure generates signaling messages for controlling receiver operations corresponding to three embodiments, and delivers the generated signaling messages to the receiver 100. In a first embodiment of the present disclosure, if AL-FEC decoding is performed with respect to at least two assets based on one repair flow, a signaling message for controlling the AL-FEC decoding and de-jitter buffering with respect to the AL-FEC-applied packets is generated.

In a second embodiment of the present disclosure, if two-step AL-FEC decoding is performed with respect to at least two assets and an AL-FEC decoding buffer is independently configured for each step, a signaling message for controlling the AL-FEC decoding and de-jitter buffering with respect to the AL-FEC-applied packets is generated.

In a third embodiment of the present disclosure, if two-step AL-FEC decoding is performed with respect to at least two assets using one AL-FEC decoding buffer, a signaling message for controlling the AL-FEC decoding and de-jitter buffering with respect to the AL-FEC-applied packets is generated.

More specifically, a signaling message according to each embodiment may include information for AL-FEC decoding and information for de-jitter buffering at the receiver 100. An example of the information for AL-FEC decoding may include a maximum size of the AL-FEC decoding buffer and a size of the AL-FEC decoding buffer for repairing a current source block. Information for de-jitter buffering may be generated in the form of an HRBM parameter and delivered to the receiver 100. Information for de-jitter buffering according to an embodiment of the present disclosure may include a transmission delay max value max_transmission_delay, a fixed end-to-end delay value fixed_end_to_end_delay, and a maximum size of a de-jitter buffer max_buffer_size. The information for AL-FEC decoding and the information for de-jitter buffering will be described in detail below.

The signaling message according to an embodiment of the present disclosure may be sent to the receiver 100 before transmission of packets for a substantial broadcasting service. If the transport network in which the broadcasting service is provided is a broadcasting network, the signaling message according to an embodiment of the present disclosure may be periodically transmitted to the receiver 100 whenever data for the broadcasting service is transmitted. The signaling message may be provided to the receiver 100 in the form of an AL-FEC message or an HRBM message when the MMT technique is applied. However, it should be noted that the signaling message may also be provided in other forms because an embodiment of the present disclosure is also applicable to other communication techniques.

The receiver 100 having received the signaling message according to the foregoing embodiment obtains information for AL-FEC decoding and de-jitter buffering based on the signaling message, and outputs the received packets based on the information.

Figure 2:
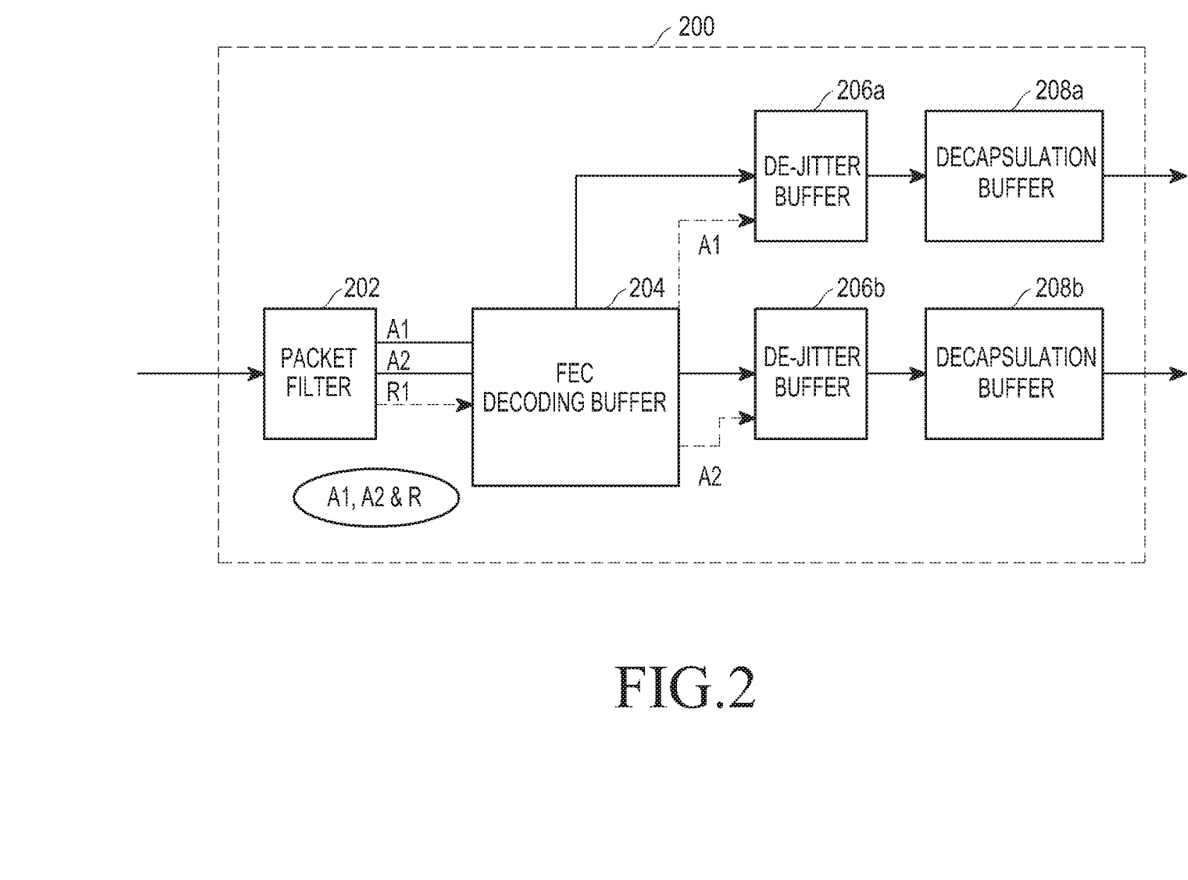
FIG. 2 illustrates an example of a receiver according to a first embodiment of the present disclosure.

FIG. 2 illustrates an example of a receiver according to a first embodiment of the present disclosure.

Referring to FIG. 2, a receiver 200 may include a packet filter 202, an AL-FEC decoding buffer 204, de-jitter buffers a 206a and b 206b, and MMT protocol (MMTP) de-capsulation buffers a 208a and b 208b.

In the first embodiment of the present disclosure, the packet filter 202 configures a source flow in which packets (hereinafter, referred to as 'source packets') protected by AL-FEC and a repair flow in which a repair packet R1 having a repair FEC payload identifier (ID) to deliver at least one repair symbols for protecting the source flow is input, and connects the source flow and the repair flow to the FEC decoding buffer 204. The source packet also has a payload ID.

Although there are two source flow to be inputted source packets to be, and each of the two source flow is a sub flow corresponding to i.e., asset 1 A1 and asset 2 A2, for convenience in FIG. 2, an embodiment of the present disclosure is also applicable to a case where two or more sub flow corresponding to two or more source packets exist. Herein, assuming that the MMT system is applied to the receiver 200, the source flow may correspond to sub flows of MMTP flows for each of the asset 1 A1 and the asset 2 A2, and MMTP packets belonging to each sub flow are identified by a Packet_ID field value of the MMTP packet header.

A maximum size of the AL-FEC decoding buffer 204 may be calculated based on a signaling message sent by the transmitter, e.g., AL-FEC configuration information received in the form of an AL-FEC message. The AL-FEC configuration information may include a 'length of a repair symbol', a 'maximum value k for a repair flow', and a 'maximum value p for the repair flow' to be used for calculation of the maximum size of the AL-FEC decoding buffer 204. Herein, the length of the repair symbol is in a byte unit, k is defined by a maximum number of source symbols, and p is defined by a maximum number of repair symbols.

The transmitter according to an embodiment of the present disclosure may calculate the maximum size of the FEC decoding buffer 204 from the FEC configuration information as below.

$$\text{Maximum Size of FEC Decoding Buffer} = \text{Length of Repair Symbol} \times (k+p) \quad \text{[Equation 1]}$$

The transmitter may calculate the size of the AL-FEC decoding buffer required AL-FEC decoding of a source block that is currently to be AL-FEC-decoded, by using the repair FEC payload ID transmitted through the repair packet, as below.

$$\text{Size of FEC Decoding Buffer} = \text{Length of Repair Symbol} \times (\text{RSB Length} + \text{SSB Length}) \quad \text{[Equation 2]}$$

A repair symbol block (RSB) length is defined by the number of repair symbols of a repair symbol block used for FEC decoding, and a source symbol block (SSB) is defined by the number of source symbols of a source block used for FEC decoding. The receiver may obtain the RSB length and the SSB length from the repair FEC payload ID transmitted through the repair packet for protecting the source block.

The AL-FEC decoding buffer 204 then converts source packets input through the source flows into source symbols by using a source block generation algorithm based on information obtained from the signaling messages of the transmitter, and stores the source symbols. The repair symbols included in the repair packet input through the repair flow are also stored in the AL-FEC decoding buffer 204. The source block generation algorithm may be previously agreed between the transmitter and the receiver, or the transmitter may select one of one or more agreed algorithms to generate the source block and deliver the used method to the receiver through signaling information.

The receiver 200 performs AL-FEC decoding with respect to an SSB and an RSB buffered in the AL-FEC decoding buffer 204 at the AL-FEC decoding time obtained from signaling information of the transmitter to recover a source block, converts recovered source symbols into source packets, and outputs the source packets to the de-jitter buffers 206a and 206b. The AL-FEC decoded packets of A1 are output to the de-jitter buffer 206a, and the AL-FEC decoded packets of A2 are output to the de-jitter buffer 206b. Herein, the AL-FEC decoding time may be calculated as a sum of FP_TS and 'protection_window_time'. The FP_TS is a timestamp value assigned to a source packet or a repair packet the transmitter first transmits in an FEC packet block, and may be obtained from a payload ID of the source packet or a payload ID of the repair packet. If the MMT technique is applied, the FP_TS may be obtained from the MMTP packet header. In this case, source packets input to the FEC decoding buffer 204 are copied to the de-jitter buffers 206a and 206b, respectively, upon being input to the FEC decoding buffer 204, or copied to the de-jitter buffers 206a and 206b, respectively, together with the recovered source packet, after being AL-FEC decoded.

The de-jitter buffers 206a and 206b also delay source packets to correspond to a fixed end-to-end delay value obtained from a signaling message previously received from the transmitter, and then output the source packets to the decapsulation buffers 208a and 208b. More specifically, the de-jitter buffers 206a and 206b according to the first embodiment of the present disclosure apply a common HRBM parameter to two assets A1 and A2 on which FEC coding is performed based on the identical repair packet R1. As mentioned above, the HRBM parameter according to an embodiment of the present disclosure may include a transmission delay maximum value, a fixed end-to-end delay value, and a maximum size of a de-jitter buffer. Herein, the transmission delay maximum value has been determined by the transmitter during an initial network setup process or has been set by measuring a message exchange time between the transmitter and the receiver, and may include an operating time in which a packet is divided. The fixed end-to-end delay value may be calculated as a sum of the transmission delay maximum value and 'protection_window_time'. The 'protection_window_time' is defined as a time required to transmit the source packet block and the repair packet block. The source packet block is defined as a set of source packets protected by one block among source packets belonging to a source flow, and the repair packet block is defined as a set of repair packets for protecting the source packet block.

The maximum size of the de-jitter buffer is calculated using the fixed end-to-end delay value as below.

$$\text{Maximum Size of De-jitter Buffer} = (\text{Fixed End-to-End Delay Value} - \text{Minimum Delay}) \times \text{Maximum Bit Rate} \quad \text{[Equation 3]}$$

The maximum bit rate is set for each asset, and a predefined value may be used for the maximum bit rate depending on a type of an asset or the transmitter may deliver a set value to the receiver by using a separate signaling message.

The AL-FEC configuration information used to calculate the HRBM parameter according to an embodiment of the present disclosure may further include the number of assets protected by the repair flow and an identifier of an asset protected by the repair flow.

Then, the decapsulation buffers 206a and 206b perform decapsulation with respect to the packets input from the de-jitter buffers 204a and 204b and output recovered data.

Figure 3:
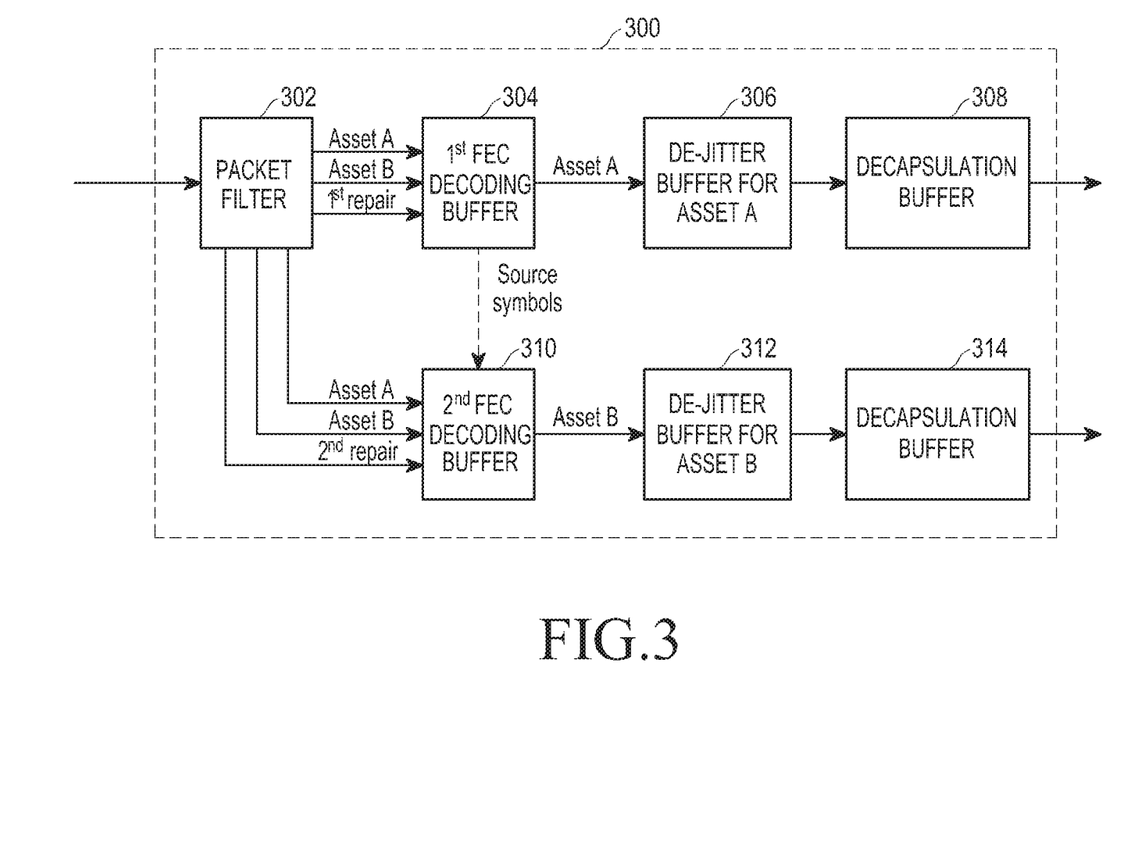
FIG. 3 illustrates an example of a receiver according to a second embodiment of the present disclosure.

FIG. 3 illustrates an example of a receiver according to a second embodiment of the present disclosure.

Referring to FIG. 3, a receiver 300 may include a packet filter 302, a $1^{st}$ FEC decoding buffer 304 and a $2^{nd}$ FEC decoding buffer 310 for two-step FEC decoding, a de-jitter buffer 306 for the asset A, a de-jitter buffer 312 for the asset B, and decapsulation buffers 308 and 314.

The receiver 300 receives, for example, two-step AL-FEC-applied packets through a signaling message received from the transmitter, and identifies repair packets generated in each step. For example, it is assumed that the signaling message includes information indicating that two-step FEC has been applied to packets included in the asset A and the asset B. It is also assumed that the two-step AL-FEC has been applied to both the asset A and the asset B, but the receiver performs AL-FEC decoding of the first step with respect to the asset A and then outputs the AL-FEC decoded asset A to the decapsulation buffer 308 and performs AL-FEC decoding of the two steps with respect to the asset B and then outputs the AL-FEC decoded asset B to the decapsulation buffer 314. More specifically, the asset A may be data that needs real-time output, such as video, audio, etc., and the asset B may be data needing non-real-time output, such as a file, etc.

The packet filter 302 connects two source flows for the asset A and the asset B, respectively, and a $1^{st}$ repair flow for $1^{st}$ FEC decoding to the $1^{st}$ FEC decoding buffer 304. The packet filter 302 connects two source flows for the asset A and the asset B, respectively, and a $2^{nd}$ repair flow for $2^{nd}$ FEC decoding to the $2^{nd}$ FEC decoding buffer 310.

The $1^{st}$ FEC decoding buffer 304 and the $2^{nd}$ FEC decoding buffer 310 operate based on AL-FEC decoding information obtained from the signaling message received from the transmitter, respectively, as described below. The AL-FEC decoding information may include a length of a repair symbol, which is set to a different value for each repair flow, a maximum value k of a source symbol block size of the repair flow, a maximum value p of a repair symbol block size of the repair flow, and protection_window_time. The two-step FEC includes two repair flows. In an embodiment of the present disclosure, a source symbol block of the $2^{nd}$ FEC decoding is generated by conjugating a predetermined number of source symbol blocks, for example, n source symbol blocks, of the $1^{st}$ FEC decoding. Thus, 'protection_window_time' and the maximum value k of the source symbol block size of the $2^{nd}$ repair flow may be set greater than 'protection_window_time' and the maximum value k of the source symbol block size of the $1^{st}$ repair flow. As a result, 'transmission delay maximum value' of the FEC information according to the second embodiment of the present disclosure is set to an identical value for two assets, and a fixed end-to-end delay and a maximum size of a de-jitter buffer are calculated for the asset A using protection_window_time of the $1^{st}$ repair flow and the maximum bit rate of the asset A, and are calculated for the asset B using protection_window_time of the $2^{nd}$ repair flow and the maximum bit rate of the asset B.

The $1^{st}$ AL-FEC decoding buffer 304 then converts source packets input through the source flows for the asset A and the asset B into source symbols by using a source block generation algorithm based on information obtained from the signaling messages of the transmitter, and stores the source symbols. The repair symbols included in the repair packet input through the $1^{st}$ repair flow are also stored in the AL-FEC decoding buffer 304. The receiver 300 performs AL-FEC decoding with respect to an SSB and an RSB buffered in the AL-FEC decoding buffer 304 at the AL-FEC decoding time obtained from signaling information of the transmitter for the $1^{st}$ repair flow to recover a source block, selects source symbols corresponding to the asset A from among the recovered source symbols, converts the selected source symbols into source packets, and outputs the source packets to the de-jitter buffer 306 for the asset A. The recovered source block is delivered to the $2^{nd}$ FEC decoding buffer 310 in the form of a source block or may be delivered to the $2^{nd}$ FEC decoding buffer 310 after being converted into source packets.

The $2^{nd}$ FEC decoding buffer 310 receives the recovered source symbol block from the $1^{st}$ FEC decoding buffer 304, and generates a source symbol block for the $2^{nd}$ FEC decoding by conjugating a predetermined number of, for example, n, source symbol blocks. Thus, the $2^{nd}$ FEC decoding buffer 310 does not store input packets. The $2^{nd}$ FEC decoding buffer 310 buffers second repair packets received through the $2^{nd}$ repair flow RSB on an RSB length basis and performs the $2^{nd}$ FEC decoding. The $2^{nd}$ FEC decoding buffer 310 outputs packets of the asset B on which the $2^{nd}$ FEC decoding is performed to the de-jitter buffer 312 for the asset B.

In another embodiment of the present disclosure, independently of the $1^{st}$ FEC decoding buffer 304, the $2^{nd}$ AL-FEC decoding buffer 310 then converts source packets input through the source flows for the asset A and the asset B into source symbols by using a source block generation algorithm based on information obtained from the signaling messages of the transmitter, and stores the source symbols. The source packets of the asset A and the asset B recovered during the $1^{st}$ AL-FEC decoding process are input to the $2^{nd}$ FEC decoding buffer 310 in the form of source packets or source symbols by using a separate interface.

In another embodiment of the present disclosure, the source packets of the asset B recovered during the $1^{st}$ AL-FEC decoding process are copied to the de-jitter buffer 312 for the asset B prior to the $2^{nd}$ AL-FEC decoding.

The de-jitter buffer 306 for the asset A and the de-jitter buffer 312 for the asset B wait such that the decoded packets input from the $1^{st}$ FEC decoding buffer 304 and the $2^{nd}$ FEC decoding buffer 310 have fixed end-to-end delay values obtained from the signaling information of the transmitter, and then outputs the packets to the decapsulation buffers 308 and 314. The fixed end-to-end delay values of the de-jitter buffer 306 for the asset A and the de-jitter buffer 312 for the asset B according to the second embodiment of the present disclosure are set to different values based on 'protection_window_time' of the $1^{st}$ FEC decoding and 'protection_window_time' of the $2^{nd}$ FEC decoding, which are set to different values.

Figure 4:
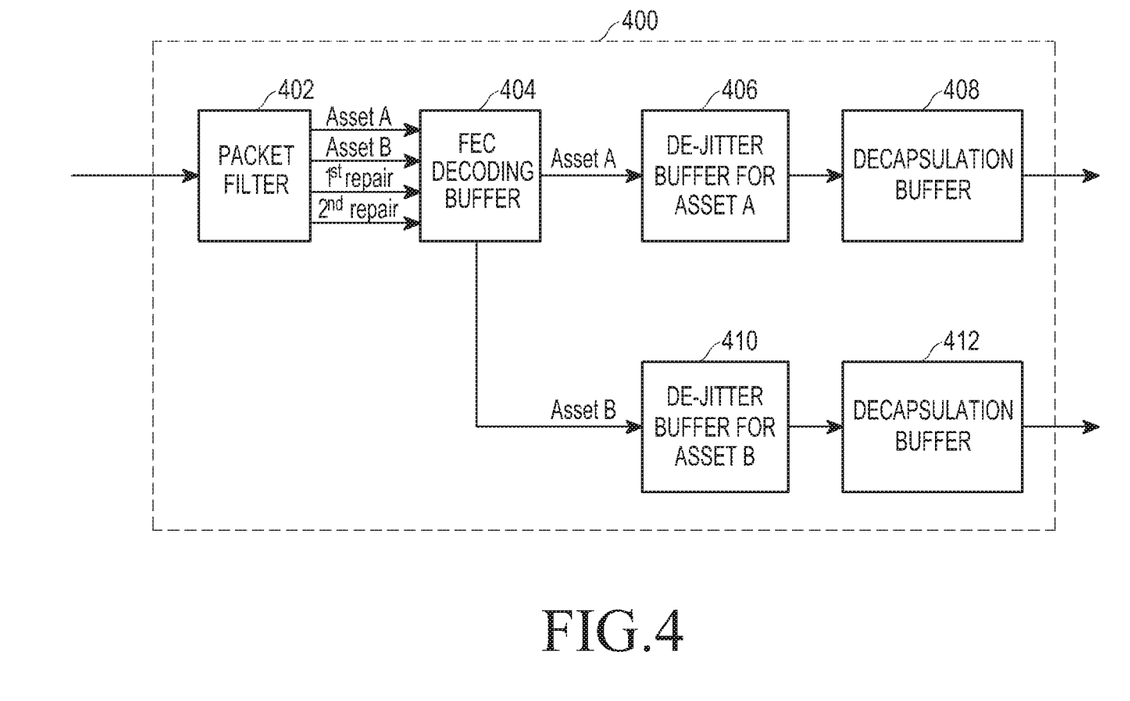
FIG. 4 illustrates an example of a receiver according to a third embodiment of the present disclosure.

FIG. 4 illustrates an example of a receiver according to a third embodiment of the present disclosure.

Referring to FIG. 4, a receiver 400 performs two-step AL-FEC decoding like the second embodiment of the present disclosure. However, the receiver 400 according to the third embodiment performs two-step FEC decoding through one AL-FEC decoding buffer 404. Likewise, for two-step AL-FEC decoding, the packet filter connects two repair flows, i.e., the $1^{st}$ repair flow and the $2^{nd}$ repair flow to the AL-FEC decoding buffer 404. The packet filter also connects source flows in which packets of each of the two assets A and B are delivered to the AL-FEC decoding buffer 404.

The AL-FEC decoding buffer 404 obtains AL-FEC information configured differently for respective repair flows from the signaling message of the transmitter as performing the two-step FEC decoding. The AL-FEC decoding information is set to a different value for each repair flow and may include a length of a repair symbol, which is set to a different value for each repair flow, a maximum value k of a source symbol block size of the repair flow, a maximum value p of a repair symbol block size of the repair flow, and protection_window_time.

The FEC decoding buffer 404 generates a source symbol block for the $2^{nd}$ FEC decoding by conjugating a predetermined number n of source symbol blocks for the $1^{st}$ FEC decoding. The receiver 400 performs the $1^{st}$ FEC decoding and the $2^{nd}$ FEC decoding based on the AL-FEC information obtained from the signaling information of the transmitter by using the FEC decoding buffer 404. As the two-step FEC is performed using one decoding buffer, the AL-FEC information according to the third embodiment is set as described below.

The maximum size of the AL-FEC decoding buffer is calculated using the AL-FEC configuration information as below.

Maximum Size of AL-FEC Decoding Buffer=Length of Repair Symbol×(Maximum Value $k$ of Source Symbol Block Size of $2^{nd}$ Repair flow+ Maximum Value $p$ of Repair Symbol Block Size of $2^{nd}$ Repair flow+$n$*(Maximum Value $p$ of Repair Symbol Block Size of $1^{st}$ FEC Repair Flow)  [Equation 4]

The size of the FEC decoding buffer is calculated as below.

Size of AL-FEC Decoding Buffer=Length of Repair Symbol×(SSB Length for $2^{nd}$ FEC+RSB Length for $2^{nd}$ FEC)+$n$*(RSB Length for $1^{st}$ FEC)  [Equation 5]

Packets of the asset A on which the $1^{st}$ AL-FEC decoding is performed are delivered to the de-jitter buffer 406 of the asset A, and packets of the asset B on which the $2^{nd}$ AL-FEC decoding is performed are delivered to the de-jitter buffer 410 of the asset B. The de-jitter buffers 406 and 410 operate identically to the de-jitter buffers 306 and 312 of FIG. 3, and thus will not be described in detail. The fixed end-to-end delay values of the de-jitter buffer 406 for the asset A and the de-jitter buffer 410 for the asset B according to the second embodiment of the present disclosure are set to different values based on 'protection_window_time' of the $1^{st}$ FEC decoding and 'protection_window_time' of the $2^{nd}$ FEC decoding, which are set to different values.

In another embodiment of the present disclosure, the source packets of the asset B recovered during the $1^{st}$ AL-FEC decoding process are copied to the de-jitter buffer 312 for the asset B prior to the $2^{nd}$ AL-FEC decoding.

In the foregoing embodiments, it is assumed that the two-step AL-FEC has been applied to both the asset A and the asset B, but the receiver performs AL-FEC decoding of the first step with respect to the asset A and then outputs the AL-FEC decoded asset A to the decapsulation buffers 308 and 408 and performs AL-FEC decoding of the two steps with respect to the asset B and then outputs the AL-FEC decoded asset B to the decapsulation buffer 314 and 412. To cause the two assets to be output to the corresponding decapsulation buffers after undergoing the two-step AL-FEC decoding, the transmitter calculates the fixed end-to-end delay values of the de-jitter buffers 306 and 406 for the asset A and the de-jitter buffers 410 and 312 for the asset B based on 'protection_window_time' of the $2^{nd}$ FEC decoding, and then delivers the calculated fixed end-to-end delay values to the receiver.

Figure 5:
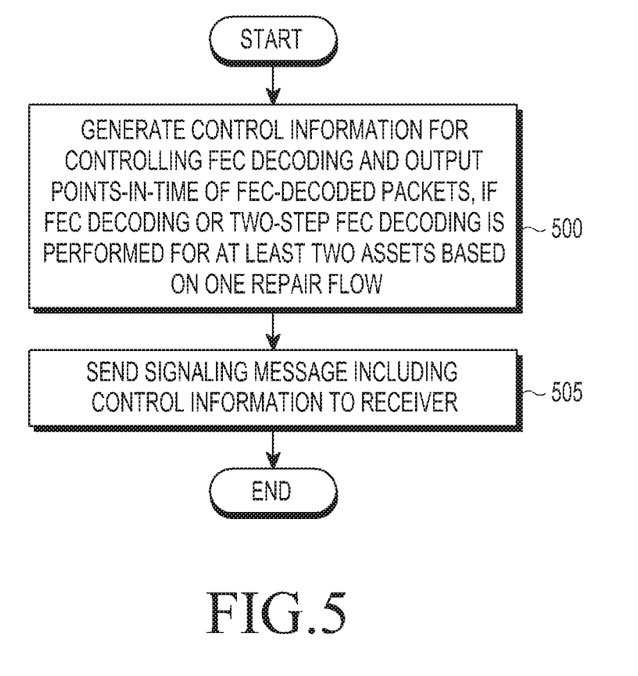
FIG. 5 is a flowchart illustrating operations of a transmitter according to an embodiment of the present disclosure.

FIG. 5 is a flowchart illustrating operations of a transmitter according to an embodiment of the present disclosure.

Referring to FIG. 5, in operation 500, the transmitter generates control information for controlling the AL-FEC decoding and an output point-in-time of the AL-FEC-decoded packets, if AL-FEC decoding or two-step AL-FEC decoding is performed on at least two assets based on one repair flow. In operation 505, the transmitter transmits the control information to the receiver in the form of a signaling message. The signaling message may include information for the AL-FEC decoding and information for de-jitter buffering the AL-FEC decoding, as described above. The signaling message may be sent to the receiver prior to actual transmission of AL-FEC-coded packets or together in transmission of a packet. The information for the AL-FEC decoding and the information for de-jitter buffering are separately configured according to the embodiments of FIGS. 2 through 4. A detailed description of the information has already been provided and thus will not be provided at this time.

Figure 6:
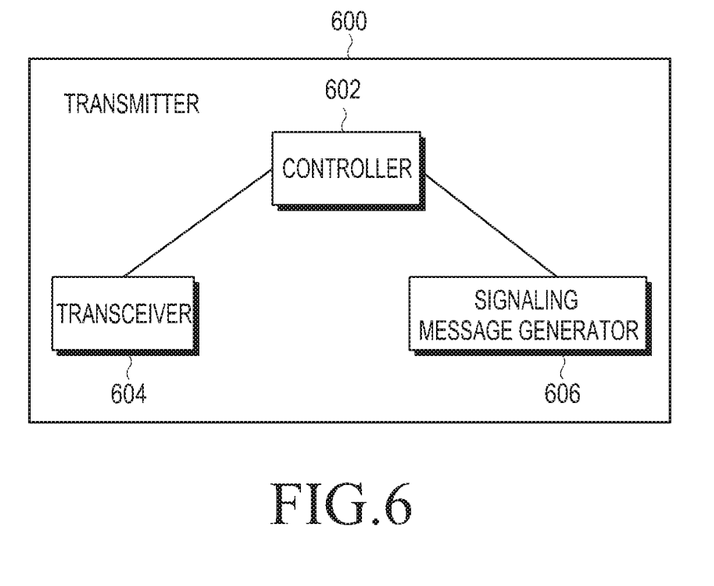
FIG. 6 is a structural diagram of a transmitter according to an embodiment of the present disclosure.

FIG. 6 is a structural diagram of a transmitter according to an embodiment of the present disclosure.

Referring to FIG. 6, a transmitter 600 may include a controller 602, a transceiver 604, and a signaling message generator 606. The illustrated structure of the transmitter is merely an example, and units may be divided or integrated depending on their functions according to an intention of an operator or an embodiment.

The controller 602 controls the signaling message generator 606 to generate the information for the AL-FEC decoding and the information for the de-jitter buffering in the first through third embodiments of the present disclosure. The signaling message generator 606 then generates a signaling message including the information for the AL-FEC decoding and the information for the de-jitter buffering according to an embodiment under control of the controller 602. The controller 602 controls the signaling message to be transmitted to the receiver through the transceiver 604. The signaling message may be sent prior to transmission of a substantial AL-FEC coded packet or periodically together with transmission of the AL-FEC coded packet.

Figure 7:
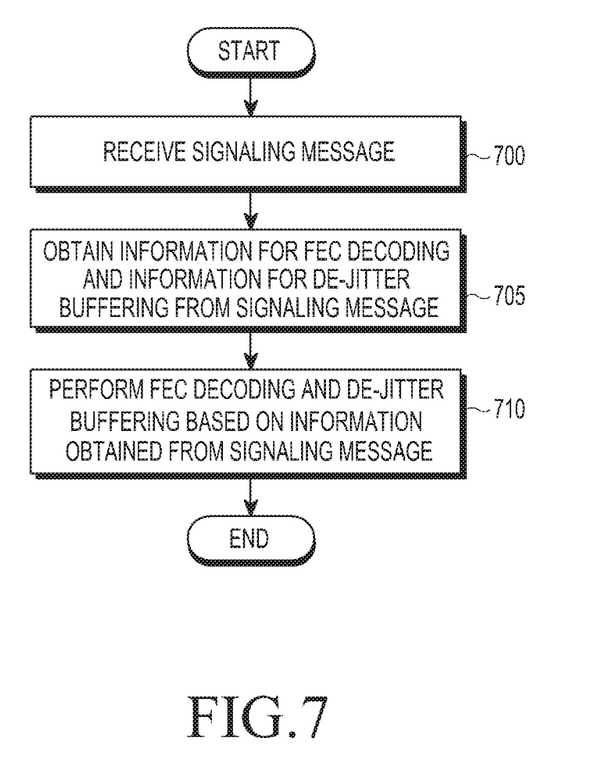
FIG. 7 is a flowchart illustrating operations of a receiver according to an embodiment of the present disclosure.

FIG. 7 is a flowchart illustrating operations of a receiver according to an embodiment of the present disclosure.

Referring to FIG. 7, the receiver receives the signaling message from the transmitter in operation 700, and obtains the information for the AL-FEC decoding and the information for the de-jitter buffering from the signaling message in operation 705. The information for the AL-FEC decoding and the information for de-jitter buffering are separately configured according to the embodiments of FIGS. 2 through 4, as mentioned above. In operation 710, the receiver performs the AL-FEC decoding based on the obtained information for the AL-FEC decoding and performs de-jitter buffering based on the obtained information for the de-jitter buffering, and outputs resulting packets.

While embodiments of the present disclosure have been described, various changes may be made without departing the scope of the present disclosure. Therefore, the scope of the present disclosure should be defined by the appended claims and equivalents thereof, rather than by the described embodiments.

The invention claimed is:

1. A method for receiving media data by a receiving apparatus in a multimedia system, the method comprising:
    receiving, from a transmission apparatus, a signaling message; and
    decoding, based on control information included in the signaling message, first media data corresponding to a first asset and second media data corresponding to a second asset, the first media data being decoded by using a first forward error correction (FEC) decoding buffer and the second media data being decoded by using the first FEC decoding buffer and a second FEC decoding buffer;

outputting the first media data to a first de-jitter buffer for the first asset and the second media data to a second de-jitter buffer for the second asset; and de-jittering the first media data by using the first de-jitter buffer and the second media data by using the second de-jitter buffer, the first media data being de-jittered based on a value of a first fixed end to end delay for the first asset and the second media data being de-jittered based on a value of a second fixed end to end delay for the second asset, wherein the first asset is related to timed data and the second asset is related to non-timed data, wherein the value of the first fixed end to end delay for the first asset is calculated by summing of a value of maximum transmission delay and a value of first protection window time for the first FEC decoding buffer, and wherein the value of the second fixed end to end delay for the second asset is calculated by summing of the value of maximum transmission delay and a value of second protection window time for the second FEC decoding buffer.

2. The method of claim 1, further comprising:

de-capsulating the first media data by using a first de-capsulating buffer and the second media data by using a second de-capsulating buffer.

3. A receiving apparatus for receiving media data in a multimedia system, the receiving apparatus comprising:

a transceiver configured to receive, from a transmission apparatus, a signaling message; and at least one processor configured to:
  decode, based on control information included in the signaling message, first media data corresponding to a first asset and second media data corresponding to a second asset, the first media data being decoded by using a first forward error correction (FEC) decoding buffer and the second media data being decoded by using the first FEC decoding buffer and a second FEC decoding buffer, output the first media data to a first de-jitter buffer for the first asset and the second media data to a second de-jitter buffer for the second asset, and de-jitter the first media data by using the first de-jitter buffer and the second media data by using the second de-jitter buffer, the first media data being de-jittered based on a value of a first fixed end to end delay for the first asset and the second media data being de-jittered based on a value of a second fixed end to end delay for the second asset, wherein the first asset is related to timed-data and the second asset is related to non-timed data, wherein the value of the first fixed end to end delay for the first asset is calculated by summing of a value of maximum transmission delay and a value of first protection window time for the first FEC decoding buffer, and wherein the value of the second fixed end to end delay for the second asset is calculated by summing of the value of maximum transmission delay and a value of second protection window time for the second FEC decoding buffer.

4. The receiving apparatus of claim 3, wherein the processor is further configured to de-capsulate the first media data by using a first de-capsulating buffer and the second media data by using a second de-capsulating buffer.

5. The method of claim 1, wherein the second media data decoded by using the first FEC decoding buffer is passed to the second FEC decoding buffer.

6. The receiving apparatus of claim 3, wherein the second media data decoded by using the first FEC decoding buffer is passed to the second FEC decoding buffer.

* * * * *